United States Patent [19]
Ohtomo et al.

[11] Patent Number: 5,513,001
[45] Date of Patent: Apr. 30, 1996

[54] TILT ANGLE AUTOMATIC COMPENSATOR IN ALL DIRECTIONS

[75] Inventors: Fumio Ohtomo; Hiroo Sugai; Ikuo Ishinabe; Takaaki Yamazaki; Junichi Kodaira, all of Tokyo, Japan

[73] Assignee: Kabushiki Kaisha TOPCON, Tokyo, Japan

[21] Appl. No.: 256,661

[22] PCT Filed: Nov. 11, 1993

[86] PCT No.: PCT/JP93/01645

§ 371 Date: Nov. 11, 1994

§ 102(e) Date: Nov. 11, 1994

[87] PCT Pub. No.: WO94/11704

PCT Pub. Date: May 26, 1994

[30] Foreign Application Priority Data

Nov. 12, 1992 [JP] Japan .................................. 4-327291
Nov. 12, 1992 [JP] Japan .................................. 4-327293

[51] Int. Cl.$^6$ ...................................................... G01C 9/18
[52] U.S. Cl. .............................. 356/249; 356/148; 33/366; 33/377
[58] Field of Search ...................................... 356/249, 148; 33/366, 377

[56] References Cited

U.S. PATENT DOCUMENTS

| | | | |
|---|---|---|---|
| 2,460,836 | 2/1949 | Lovins | 356/249 |
| 3,910,704 | 10/1975 | Richarme | 356/249 |
| 4,666,299 | 5/1987 | Tamaki et al. | 356/249 |
| 4,993,162 | 2/1991 | Scholian | 356/249 |
| 5,371,951 | 12/1994 | Piske | 356/249 |
| 5,392,112 | 2/1995 | Nakamura | 356/148 |

FOREIGN PATENT DOCUMENTS

| | | | |
|---|---|---|---|
| 0874021 | of 1942 | France | 356/249 |
| 0073482 | of 1960 | France | 356/249 |
| 0588401 | of 1959 | Italy | 356/249 |
| 45-4208 | 4/1970 | Japan | 356/249 |
| 1158311 | 2/1989 | Japan . | |
| 58099712 | 6/1993 | Japan | 356/249 |

*Primary Examiner*—Frank Gonzalez
*Assistant Examiner*—Jason D. Eisenberg
*Attorney, Agent, or Firm*—Nields & Lemack

[57] ABSTRACT

A tilt angle automatic compensator used for a device requiring verticality or horizontality is disclosed. The automatic compensator comprises a container 4 where a transparent liquid to form free liquid surface 1 is sealed, a light projection system for projecting light beam toward the free liquid surface at a predetermined angle so that it is totally reflected on the free liquid surface, and an optical system arranged at a predetermined position along optical path of the totally reflected light beam after passing through the container with sealed liquid and for equalizing change of reflection angle of optical axis corresponding to change of incident angle of optical axis in all directions. When the liquid container is tilted and incident angle of the light beam is relatively changed with respect to the free liquid surface, sensitivity varying according to the direction of change of reflection angle is optically compensated.

13 Claims, 11 Drawing Sheets

F I G. 8
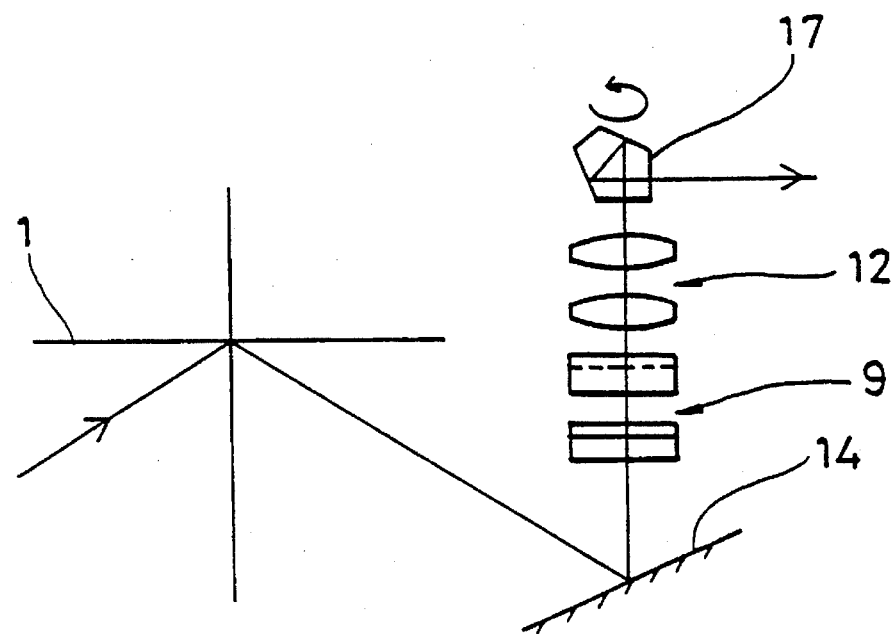
F I G. 9
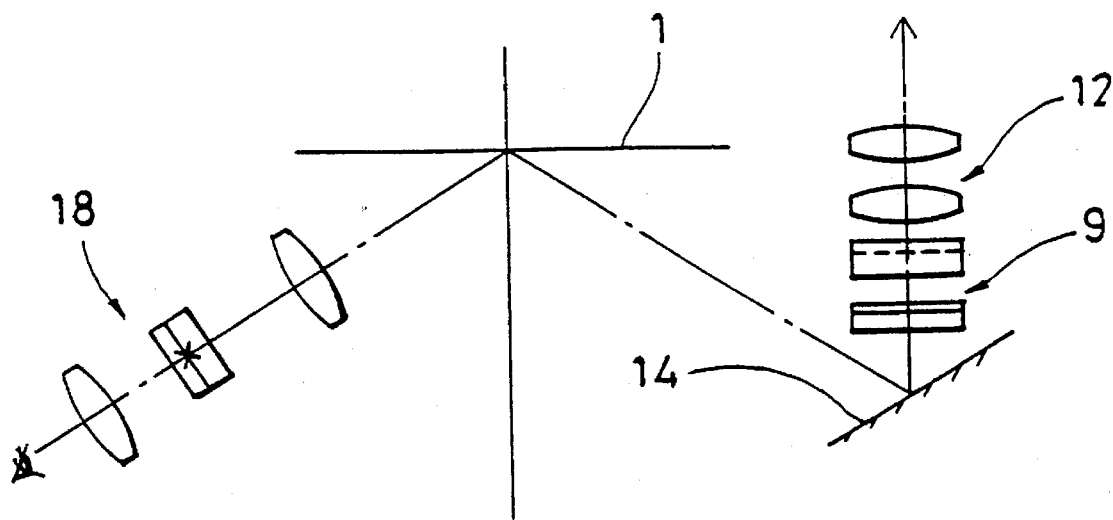

TILT ANGLE AUTOMATIC COMPENSATOR IN ALL DIRECTIONS

FIELD OF THE INVENTION

The present invention relates to a tilt angle automatic compensator used in survey instrument, a measuring instrument, etc. for measuring changes of tilting or for maintaining the optical axis of the instrument in a vertical direction.

BACKGROUND OF THE INVENTION

When a survey instrument, a measuring instrument, etc. are used for surveying purpose, it is necessary to make compensation for tilting of the reference plane of the survey instrument or the measuring instrument or to compensate deviations from the verticality of an optical axis.

In the past, compensation has been automatically performed as follows: A pendulum such as a lens or a prism is suspended by 2 or 3 suspension lines. When main unit of the survey instrument or the measuring instrument is tilted, the pendulum is braked by a braking mechanism such as a magnetic braking mechanism to automatically compensate optical path.

As one of the methods to detect tilting of reference plane of main unit of the measuring instruments, reflection on a free liquid surface is utilized.

In this method, a light beam is projected onto the free liquid surface, and any change in the optical axis of the reflected light is detected by a photodetector. When mercury is used as a liquid having free liquid surface and the light beam is projected perpendicularly to the free liquid surface, it is possible to obtain reflection angle of the same sensitivity to tilting of the liquid surface in all 2-dimensional directions, and tilting of the reference plane can be detected.

However, the liquid such as mercury as described above is not very practical to use in terms of both cost and safety, and transparent liquid such as silicone oil is used in practical application. When the transparent liquid is used, total reflection is utilized for the purpose. Because of critical angle between liquid and air, in order to achieve total reflection of light beam on liquid surface, it is necessary to project the light beam onto the free liquid surface at an incident angle θ to match the above critical angle. In conventional type tilt detecting device utilizing the free liquid surface, the light beam is irradiated to the free liquid surface at a predetermined angle.

When a light beam is irradiated to the free liquid surface at a predetermined angle, the change of reflection angle of the reflected light relating to different biaxial directions to the tilting of the liquid surface is not uniform. Therefore, in the tilting detecting device utilizing a free liquid surface, measures must be taken to take into account the non-uniform change of reflection angle in biaxial directions. For this reason, light beams with two different optical axes are projected at a predetermined angle to the free liquid surface, and the reflected light beams are received by photodetectors. Light receiving position in only one direction is detected by each photodetector, and by the change of the light receiving positions of the photodetectors, tilting to the two optical axes is detected. From the tilting of the two optical axes thus detected, tilting of reference planes of survey instrument, measuring instrument, etc. to horizontal plane are calculated, and compensation is performed based on the results of the calculation.

In the former example of the conventional type device described above, however, a pendulum is suspended and this leads to more complicated structure. Also, the suspension of the pendulum during assembling of the device is not easy, and adjustment is also not simple. Further, the change over time of suspension lines causes change in its length, and it is very difficult to maintain the accuracy. Because a special braking device is required for braking the pendulum, this also makes the structure more complicated. Further, suspension structure of the pendulum is very delicate and is susceptible to shock.

In the latter example of the conventional type device, utilizing total reflection on a free liquid surface, assembling and adjustment are simple, and there is no change over time because no suspension line is used. Because the liquid is used in closed condition, the device has high shock-resistance and high resistance to environmental conditions. Because liquid is used, braking can be performed by utilizing viscosity of the liquid, and no braking device is required. Thus, the problems in the vertical direction tilting automatic compensator using a pendulum have been overcome by the latter device.

However, because light beams with two different optical axes are irradiated to the free liquid surface at predetermined angles, projection system of light beams is divided into two optical systems, and this leads to the more complicated arrangement of the device.

To solve the above problems, the compensator of the present invention detects tilting of reference plane or performs automatic compensation of vertical line by monoaxial optical system only, utilizing total reflection of free liquid surface.

DISCLOSURE OF THE INVENTION

The automatic compensator according to the present invention basically comprises a container where a transparent liquid to form a free liquid surface is sealed, a light projection system for projecting a light beam toward the free liquid surface at a predetermined angle so that it is totally reflected from the free liquid surface along an optical path, and an optical system, arranged at a predetermined position along the optical path of the totally reflected light beam after passing through the container with sealed liquid, for equalizing in all directions change of the reflection angle of the reflected beam corresponding to a change of incident angle of the incident beam.

Because of the above arrangement, even when the free liquid surface is tilted to the incident light toward any direction, compensation is made to equalize the change of incident angle and the change of reflection angle. Thus, tilting angle of the entire arrangement can be automatically compensated according to the change of reflection angle, and this can be utilized for automatic compensation of survey instruments and other instruments and devices.

Because the compensator comprises a container with transparent liquid sealed therein to form free liquid surface, a light projection system for projecting light beam to the free liquid surface at a given angle so that total reflection occurs on the free liquid surface, a mirror for reflecting the light beam reflected on the free liquid surface in vertical direction, and an optical system arranged at a predetermined position of optical path of the reflected light beam and equalizing change of reflection angle of an optical axis corresponding to change of incident angle of an optical axis in all directions and for offsetting angular change of the reflected axis optical corresponding to incident angle change of optical axis. Accordingly, even when the incident angle of light beam to the free liquid surface is relatively changed, angular change of the reflection is light beam optically offset, and the light beam directed in vertical direction is always maintained in vertical direction and the vertical light beam is utilized as reference in surveying.

It is possible to form a horizontal reference line or a horizontal reference plane by a horizontal light beam when a light path converting means to irradiate vertical light beam in horizontal direction is provided and when the optical path converting means is rotated.

If a telescope system is arranged on incident light side, it can be used as a vertical device. Further, if a mirror reflecting the reflected light beam in vertical direction is used as a half-mirror and moving range of the light beam passing through the half-mirror is detected by a photodetector, it is possible to judge that the tilting of the entire survey instrument is within the limitation.

Further, in order that temperature distribution does not occur in the liquid to form the total reflection surface as the condition of use changes, the liquid is maintained in flat configuration and a heat transfer plate to promote thermal dispersion of the liquid is provided. In addition, a heat insulating layer to suppress heat transfer to outside is formed. As a result, non-uniformity of refractive index does not occur in the liquid, and refraction of optical axis is prevented.

BRIEF DESCRIPTION OF THE DRAWINGS

FIG. 8 is a drawing for explaining an application example of the present invention;

FIG. 9 is a drawing for explaining another application example of the present invention;

BEST MODE FOR CARRYING OUT THE INVENTION

Figure 1:
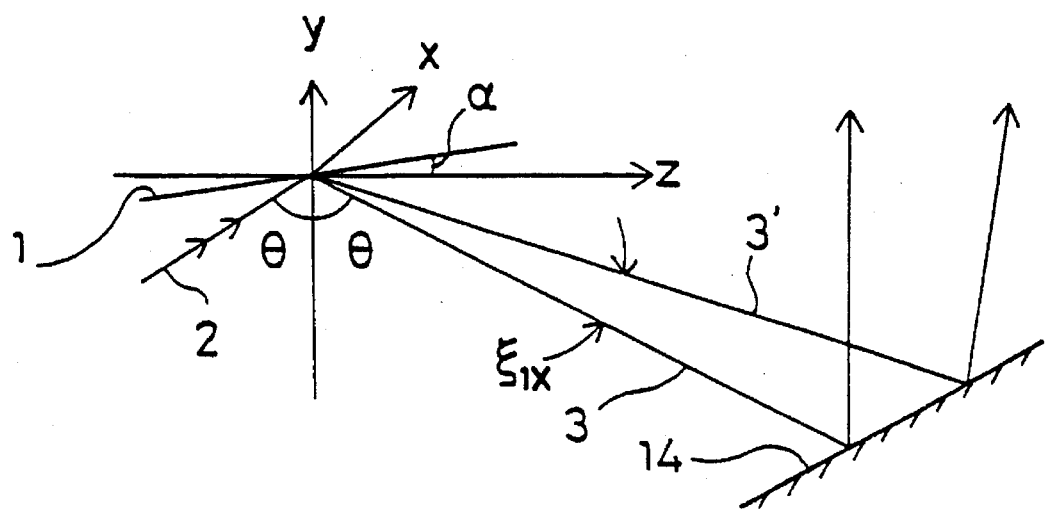
FIG. 1 is a drawing for explaining the changes of reflection angle of a reflected light beam when a free liquid surface is tilted.

In the following, detailed description will be given on the present invention in connection with the drawing attached herewith:

FIG. 1 is a diagram showing various relationships between the incident light beam and the free liquid surface from which it is totally reflected.

Figure 2:
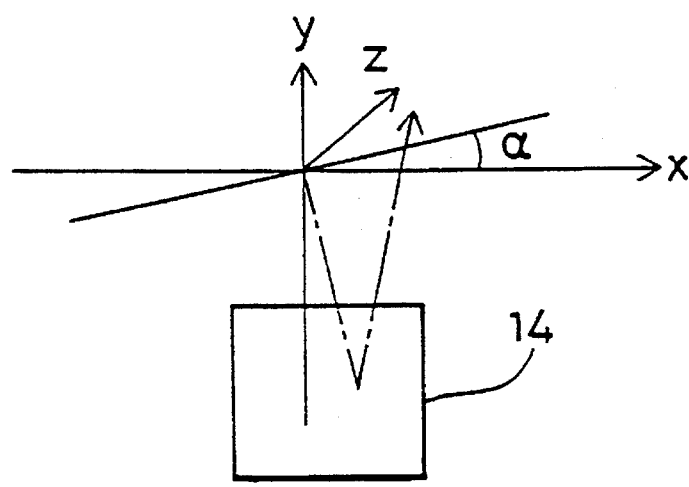
FIG. 2 is a drawing for explaining changes of reflection angle of a reflection light beam when a free liquid surface is tilted.

First, referring to FIG. 1 and FIG. 2, when a light beam is irradiated to a free liquid surface at a predetermined angle and the light beam is totally reflected on the free liquid surface, and if the free liquid surface is relatively tilted with respect to the light beam, the sensitivity of the change of reflection angle with respect to the tilting direction of the liquid surface differs.

In fact, the free liquid surface maintained horizontally and it is the incident direction of the light beam which is changed. However, the following description will be given under the assumption that the incident direction of the light beam is constant and the free liquid surface is tilted.

In the figure, reference numeral 1 represents a free liquid surface, and it is supposed that an incident light beam 2 enters the free liquid surface 1 at an angle θ. It is assumed that the free liquid surface 1 is approximately aligned a plane in x-z coordinate formed by coordinate axis x and coordinate axis z and that the coordinate axis perpendicular to the coordinate plane is y. It is also assumed that an optical axis of the incident light beam 2 is present in a coordinate plane formed by the coordinate axes z and y. When the free liquid surface is tilted around the coordinate axis x by an angle α, an optical axis of reflected light beam 3 moves to the reflected light beam 3' in the y-z coordinate plane, and reflection angle is changed by ξ1x within the x-y coordinate plane. In this case, the relation between liquid surface displacement angle α and reflection displacement angle ξ1x is expressed by ξ1x=2α, and a reflection displacement angle ξ2x within x-y coordinate plane does not occur. In the figure, reference numeral 14 represents a mirror.

In contrast, if the free liquid surface 1 is tilted around coordinate axis z by an angle α as shown in FIG. 2, the reflected light beam 3 is separated from the x-y coordinate plane and the y-z coordinate plane. Therefore, reflection displacement angle $\xi 1z$ and reflection displacement angle $\xi 2z$ appear respectively on the x-y coordinate plane and the y-z coordinate plane. Further, the relation between the reflection displacement angle $\xi 1z$ and the liquid surface displacement angle a of the free liquid surface 1 is given by:

$$\xi 1z = \cos^{-1}(\cos^2\theta \cos 2\alpha + \sin^2\theta)$$

$$\xi 2z = \pi/2 - \cos^{-1}(1 - \cos 2\alpha) \sin\theta \cos\theta \quad (1)$$

For instance, if it is supposed that $\alpha = 10'$ and $\theta = 50°$, $\xi 2z = 1.7''$, the value $\xi 2z$ is negligible in terms of accuracy. Further, if it is supposed that refractive index of the liquid is optical axis after light beam has passed through the liquid is given by:

$$\xi 1x' = 2n\alpha$$

$$v1z' = n \cdot \cos^{-1}(\cos^2\theta \cos 2\alpha + \sin^2\theta) \quad (2)$$

Therefore, sensitivity to the liquid surface displacement angle $\alpha$ differs in the reflection displacement angle $\xi 1x'$ and the reflection displacement angle $\xi 1z'$. In the present invention, the difference of the sensitivities of the displacement angle in the reflection displacement angle $\xi 1x'$ and the reflection displacement angle $\xi 1z'$ is compensated and equalized by optical means. As a result, an optical axis is obtained, which exhibits angular change always at a constant rate with respect to all directions.

Now, description will be given on a first embodiment of the present invention, referring to FIG. 3.

In the figure, reference numeral 4 represents a container with liquid sealed in it and provided on main unit of a device such as a survey instrument, and a free liquid surface 1 is formed by the liquid sealed in the container 4. To the free liquid surface 1, a light beam emitted from a light source 6 is irradiated at a given angle through a collimator lens 5 so that total reflection occurs, and an optical axis of the light beam is located in y-z coordinate plane as described above.

Under the condition where the free liquid surface 1 is not tilted, a cylindrical lens system 9 having a pair of cylindrical lenses 7 and 8 and a reflection mirror 14 are arranged along an optical axis of the reflected light beam 3 totally reflected on the free liquid surface 1. Each of the cylindrical lenses 7 and 8 has curvature in only one direction. The cylindrical lens 7 is a convex cylindrical lens having focal length f1, and the cylindrical lens 8 is a concave cylindrical lens having focal length f2.

The light beam passing through the cylindrical lens system 9 is reflected by the reflection mirror 14 in vertical direction, and the light beam reflected by the reflection mirror 14 passes through a beam expander 12, which comprises convex lenses 10 and 11. Here, if it is supposed that focal length of the convex lens 10 is f3 and focal length of the convex lens 11 is f4, the distance between the convex lens 10 and the convex lens 11 is set to: f3+f4.

The cylindrical lens system 9 may be arranged along an optical path after reflected by the reflection mirror 14.

In the following, description will be given on the operating principle.

Figure 4A:
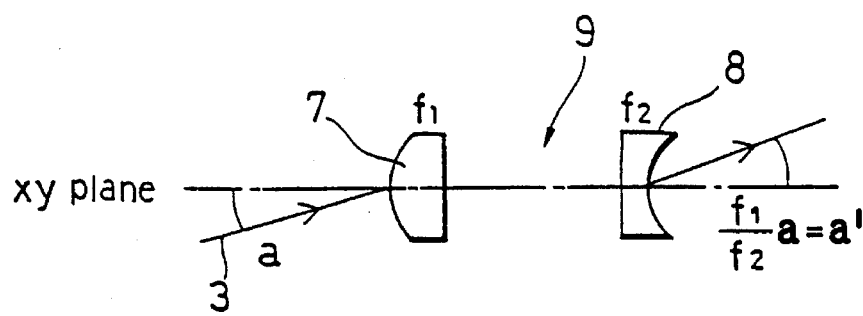
FIG. 4 (A) and FIG. 4 (B) each is a drawing for explaining changes of an optical axis of transmitted light beam to a cylindrical lens system in the first embodiment of the invention.
Figure 4B:
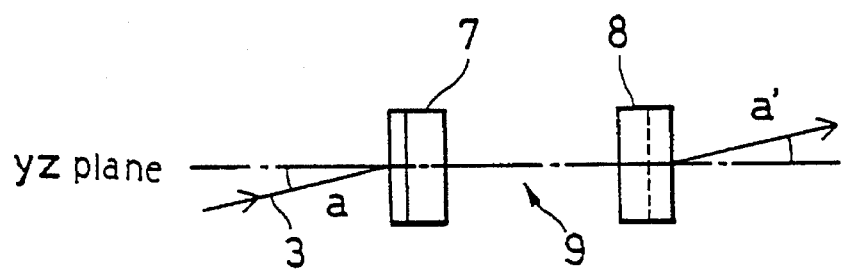

First, in case a light beam enters from the direction of radius of curvature of the cylindrical lens 7 as shown in FIG. 4 (A), the relation of the angles formed by the reflected light beam 3 and the optical axis of the cylindrical lens 7, i.e. incident angle a and exit angle a' from the cylindrical lens 8 is given by:

$$a' = (f1/f2) a \quad (3)$$

Also, in case light beam enters from a plane including generating line of curved surface of the cylindrical lens 7 as shown in FIG. 4 (B), the relation of the angles formed by the reflected light beam 3 and the optical axis of the cylindrical lens 7, i.e. incident angle $\alpha$, and exit angle a' from the cylindrical lens 8 is given by:

$$a = a' \quad (4)$$

Here, to the moving of the reflected light beam 3 in case the free liquid surface I is tilted around z-axis, the cylindrical lens system 9 is arranged as shown in FIG. 4 (A), and to the moving of the reflected light beam 3 in case the free liquid surface 1 is tilted around x-axis, the cylindrical lens system 9 is arranged as shown in FIG. 4 (B).

Figure 3:
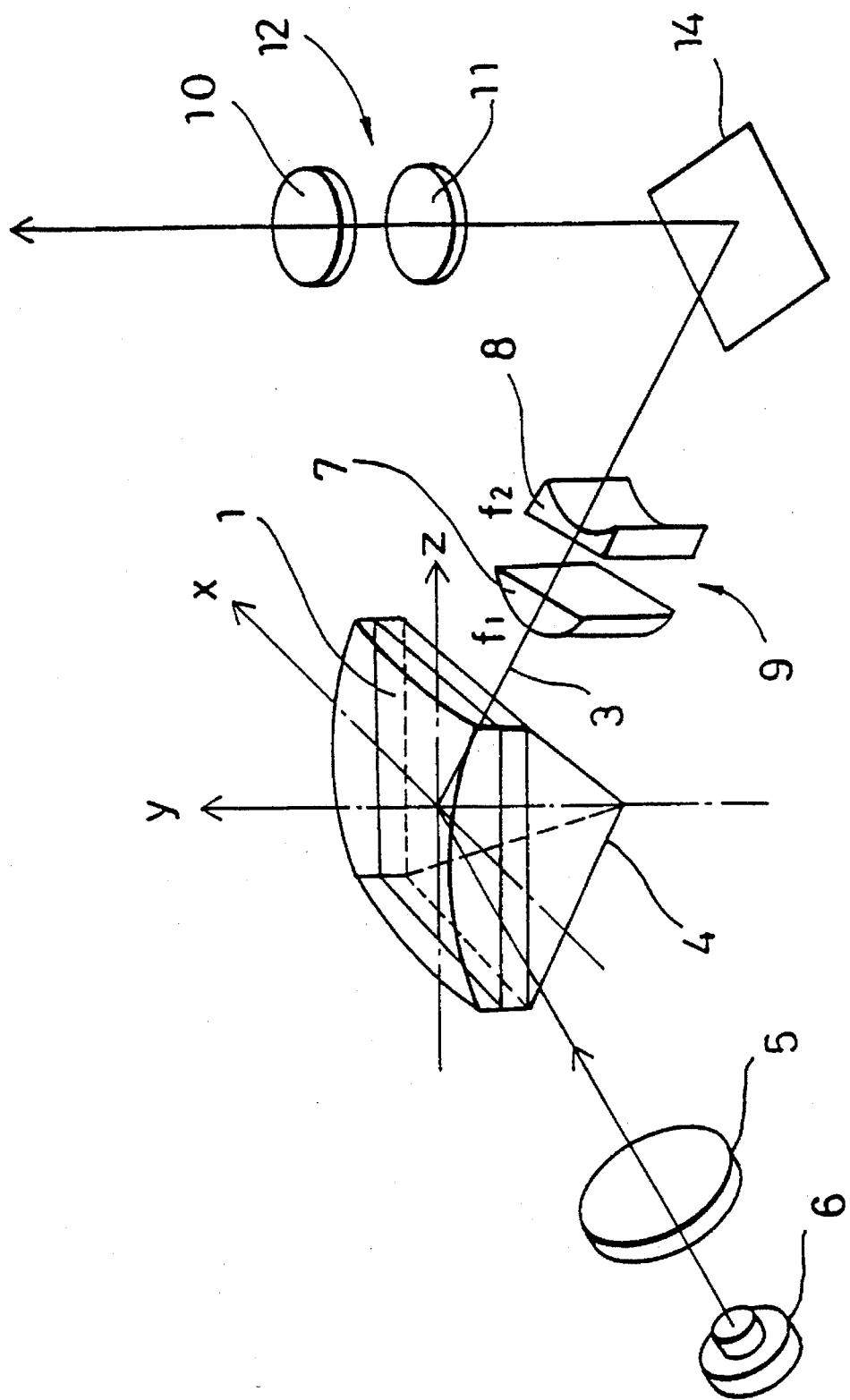
FIG. 3 is a drawing for explaining a basic configuration of a first embodiment of the present invention.

If it is supposed in FIG. 3 that the setting incident angle $\theta$ to the liquid is 50°, tilt angle of the device, i.e. tilt angle $\alpha$ of the free liquid surface 1 is 10', and refractive index n of the liquid is 1.4, the reflection displacement angle $\xi 1x'$ in case the free liquid surface 1 is tilted around x-axis and the reflection displacement angle $\xi 1z'$ in case the free liquid surface 1 is tilted around z-axis are given by the equation (2) as $\xi 1x'=28'$ and $\xi 1z'=18'$ respectively. Therefore, the difference of sensitivity between the reflection displacement angle $\xi 1x'$ and the reflection displacement angle $\xi 1z'$ is: $(\xi 1x'/\xi 1z')=1.555$ times.

Accordingly, under this condition, there exist the following relations:

$$\xi 1x'=2n\alpha; \xi 1z'=1.286n\alpha \quad (5)$$

Therefore, if $(f1/f2)=2/1.286$ from the equation (2), the displacement angle $\xi 1z'$ of optical axis transmitted through the cylindrical lens system 9 is converted to: $1.286\ n\alpha \times 2/1.286 = 2\ n\alpha$, and after passing through the cylindrical lens system 9, $\xi 1x'=\xi 1z'$. Thus, even when the free liquid surface 1 is tilted to any direction, reflection displacement angle of the same sensitivity can be obtained to the tilting. Thus, the tilting of the free liquid surface, i.e. tilting of the entire device, can be obtained based on of reflection displacement angles.

Further, in case light beam passing through the cylindrical lens system 9 and being reflected upward by the reflection mirror 14 passes through the beam expander 12, and if angular magnification of the beam expander 12 is ½ n times, optical axis after transmitting is tilted by:

$$(\xi 1x'=\xi 1z'=2n\alpha) \times \tfrac{1}{2}n = \alpha \quad (6)$$

The final optical axis after passing through the beam expander 12 runs always perpendicularly to the free liquid surface 1, i.e. it is maintained in vertical direction. If it is supposed that focal length of the convex lens 10 is f3 and focal length of the convex lens 11 is f4, angular magnification of the expander 12 is f3/f4. By selecting f3 and f4, angular magnification can be set to ½ n.

Next, with respect to the embodiment shown in FIG. 3, the cylindrical lens system 9 may be rotated by 90° to obtain:

$$(f2/f1)=1.555$$

$$(f3/f4)=1/1.286n \quad (7)$$

Figure 5A:
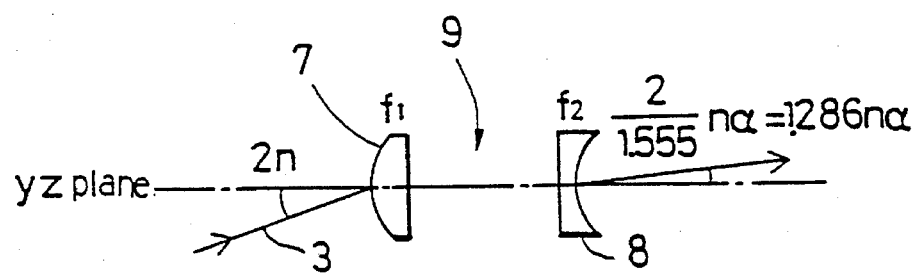
FIG. 5 (A) and FIG. 5 (B) each is a drawing for explaining changes of an optical axis of transmitted light beam to a cylindrical lens system.
Figure 5B:
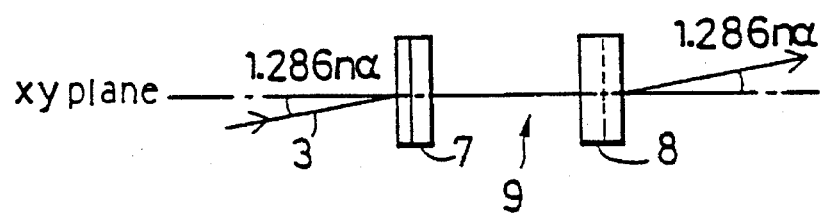

The description will be given on the relation of entering and exit of the reflected light beam 3 in case the cylindrical lens system 9 is rotated by 90°, referring to FIGS. 5 (A) and (B).

As described above, if it is supposed that the tilt angle of the free liquid surface 1 is $\alpha$, the setting incident angle of a light beam is $\theta$, and refractive index of the liquid is n, the reflection displacement angles of the optical axis of the reflected light beam 3 with respect to the free liquid surface 1 are as follows:

$\xi 1x'=2 n\alpha$ when the free liquid surface 1 is tilted around x-axis; and $\xi 1z'=1,286 n\alpha$ when the free liquid surface 1 is tilted around z-axis.

After the light beam passes through the cylindrical lens system 9, the reflection displacement angle $\xi 1x'$ is given by:

$$\xi 1x'=2n\alpha \times 1/1.555=1.286n\alpha \qquad (8)$$

and the reflection displacement angle $\xi 1z'$ is maintained as passing through the cylindrical lens system 9 as:

$$\xi 1z'=1.286n\alpha \qquad (9)$$

Further, because angular magnification of the beam expander 12 is f3/f4=1/1.286 as described above, $$(\xi 1x'=\xi 1z')\times (f3/f4)= 1.286n\alpha /1.286n=\alpha \qquad (10)$$

As described above, an optical axis can be maintained always in vertical direction.

Figure 6:
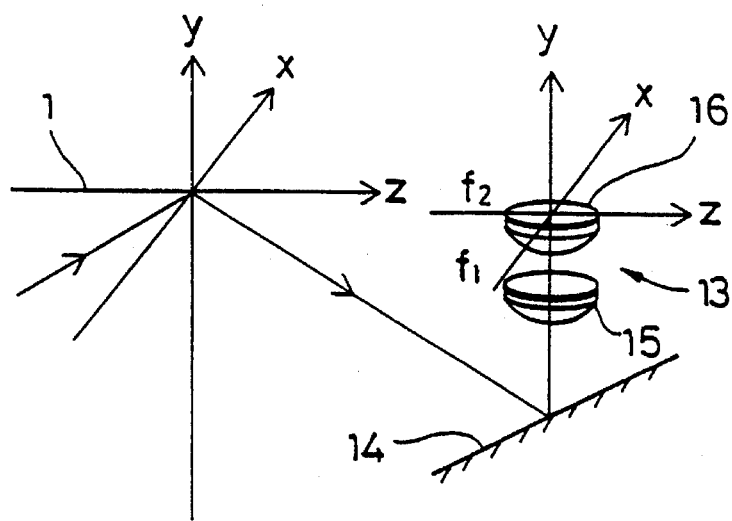
FIG. 6 is a drawing for explaining a basic configuration of a second embodiment of the present invention.

Description will be given now on a second embodiment of the invention, referring to FIG. 6.

Figure 7A:
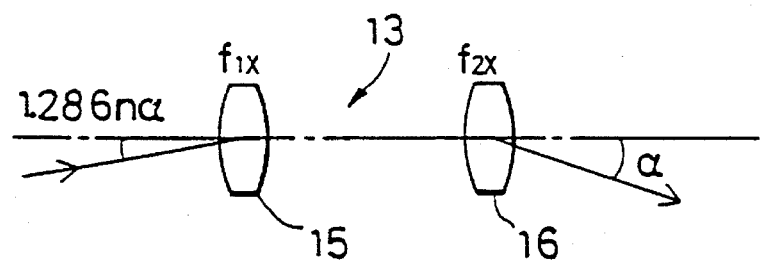
FIG. 7 (A) and FIG. 7 (B) each is a drawing for explaining changes of an optical axis of transmitted light beam to a toric lens expander in the second embodiment.
Figure 7B:
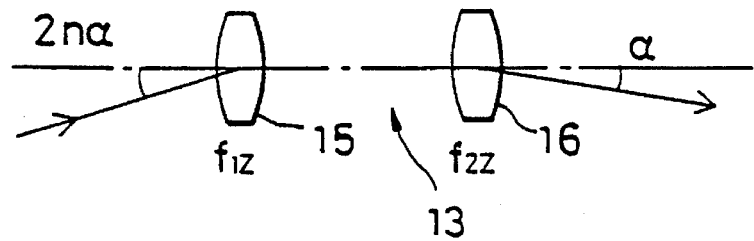

In this embodiment, the combination of the cylindrical lens system 9 and the beam expander 12 shown in FIG. 3 is replaced by an expander 13 comprising a set of a toric lenses 15 and 16. The toric lenses 15 and 16 are the lenses, which have different x-direction focal point and z-direction focal point. If it is supposed that x-direction focal points are f1x and f2x respectively, and z-direction focal points are f1z and f2z respectively, and further, if it is supposed that $$f1x/f2x=1/1.286n$$

$$f1z/f2z=1/n \qquad (11).$$

it is possible to set the exit angle from the toric lens 16 to $\alpha$ as shown in FIGS. 7 (A) and (B), and the optical axis can be maintained always in vertical direction.

As described above, it is possible according to the present invention to maintain an optical axis of an exit light beam always in vertical direction regardless of tilting of the reflecting plane and to utilize the exit light beam as vertical reference line. In the following, description will be given on application examples of the present invention.

FIG. 8 shows a pentagonal prism or a pentagonal mirror 17 rotatably arranged along an optical axis of light beam emitted from the beam expander 12. The exit light beam is emitted horizontally by the pentagonal mirror 17, and horizontal reference plane by the exit light can be formed by rotating the pentagonal mirror 17. Specifically, the present invention can be applied as a levelling device.

FIG. 9 shows another application example.

In this application example, a telescope system 18 is arranged on light source side of the first embodiment shown in FIG. 3. With such arrangement, this can be used as a vertical device.

When the system is used practically with the above arrangement, tilting of the entire system is usually limited. Therefore, it is necessary to detect whether it is within the required limit of tilting before use. Such requirement can be met by adding the following arrangement.

Figure 10:
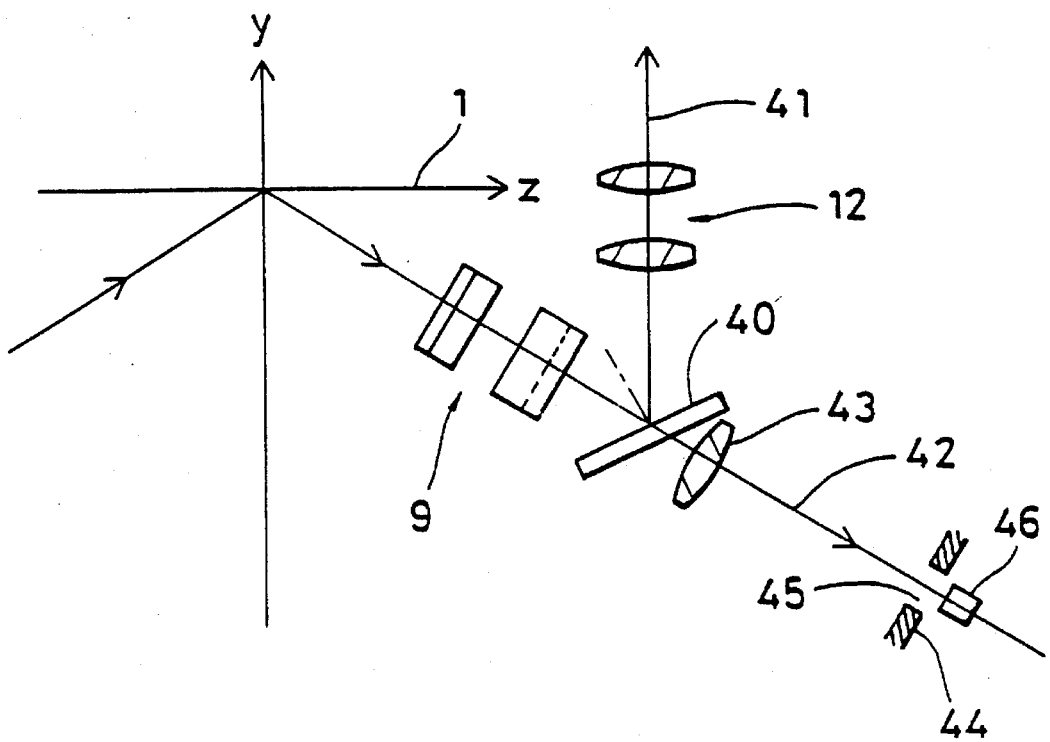
FIG. 10 is a drawing for explaining still another application example of the present invention.

Referring now to FIG. 10, instead of the reflection mirror 14 as described above, a half-mirror 40 is disposed, and the reflected light beam from the free liquid surface 1 is split into a reflected light beam 41 in vertical direction and a transmitted light beam 42. The transmitted light beam 42 passes through a convex lens 43 and through a pinhole 45 formed on a shielding plate 44 and is received by a photodetector 46. The pinhole 45 is arranged at focal point of the convex lens 43. Also, a diameter of the pinhole 45 is to be in size corresponding to the range of limitation.

When the entire system is tilted, an optical axis of the light beam reflected from the free liquid surface 1 is deviated. Because the cylindrical lens system 9 is included in this system as described above, the reflected light beam exhibits uniform sensitivity to tilt angle of the entire system in all directions. The transmitted light beam 42 passes through the convex lens 43 and the pinhole 45 and is received by the photodector 46. The pinhole 45 and the photodetector 46 are arranged at the focal point of the convex lens 43. If it is supposed that focal length of the convex lens 43 is f0, the optical axis moves by f0· tan $\xi 0$ on the pinhole 45 with respect to the reflection displacement angle $\xi 0$.

When this movement exceeds the required limit of tilting, the diameter of the pinhole 45 is determined so that light quantity received by the photodetector 46 is below the required light quantity.

By monitoring the light quantity received by the photodetector 46, it is possible to judge whether tilting of the entire system is within the limited angle.

For example, if it is supposed that incident angle $\theta$ to the free liquid surface 1 is 50°, limited tilt angle $\alpha$ of the entire system is 10', refractive index n of the liquid is 1.4, focal length f0 of the convex lens 43 is 100 mm, and pinhole diameter is then the deviation of an optical axis after passing through the cylindrical lens system 9 is: $\xi 0=2 n \alpha$. Therefore, the movement 1 of optical axis of the pinhole 45 (position of focal point of the convex lens 43) is given by:

$$l=f0\cdot \tan \xi 0=100\times \tan (2\times 1.4\times 10/60)=0.81 \qquad (12)$$

Figure 11:
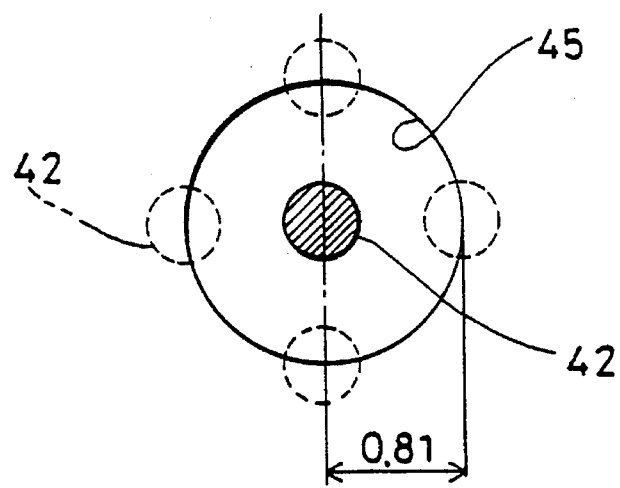
FIG. 11 is a drawing for explaining relationship between a beam spot and a pinhole in still another application example.

In case the pinhole 45 has an opening of this diameter and when a beam spot of the transmitted light beam 42 moves by 0.81 as shown FIG. 11, it is over outer diameter of the pinhole 45, and the received light quantity of the shielding plate 44 decreases. Accordingly, by stopping light emission from the light source 6 when the decreased light quantity is detected, the present invention can be used only within the required limit.

The pinhole 45 may be omitted and a photodetector such as CCD may be used as the photodetector 46, and the position of the beam spot is detected by the photodetector 46.

Figure 12:
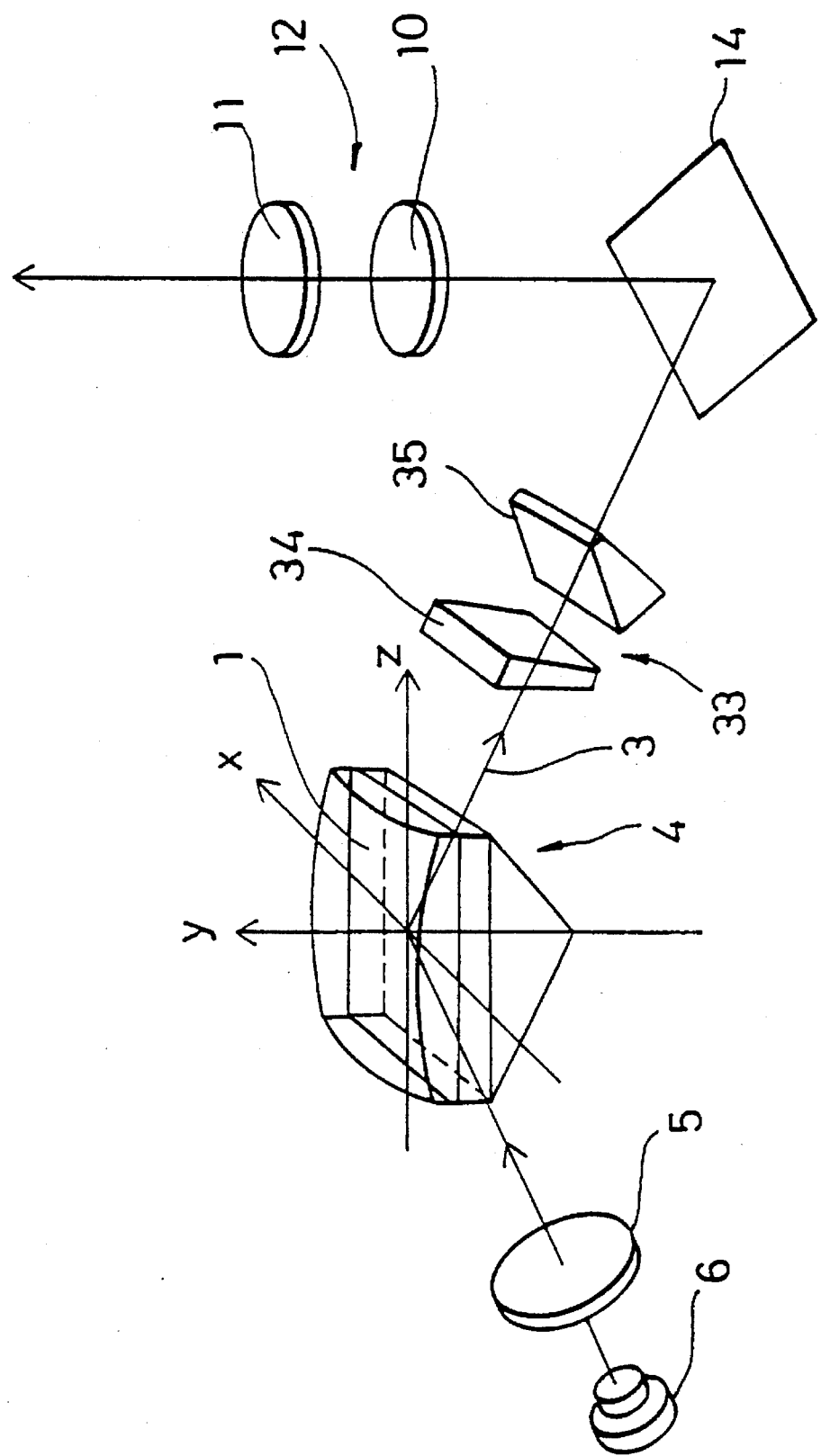
FIG. 12 shows a basic configuration of a third embodiment of the present invention.

In FIG. 12, a third embodiment of the present invention shown. The embodiment of FIG. 12 uses an anamorphic prism system 33 instead of the cylindrical lens system 9 with the configuration shown in FIG. 3.

With the free liquid surface I not tilted, an anamorphic prism system 33 comprising a pair of wedge-like prisms 34 and 35 is arranged along the optical axis of the reflected light beam 3 totally reflected by the free liquid surface 1.

The light beam passing through the anamorphic prism system 33 is reflected by a reflection mirror 14 in vertical direction, and the light beam reflected by the reflection mirror 14 is passed through the beam expander, which comprises convex lenses 10 and 11. If it is supposed that focal length of the convex lens 10 is f3 and focal length of the convex lens 11 is f4, the distance between the convex lenses 10 and 11 is set to: f3+f4.

The anamorphic prism system 33 may be arranged along the optical path after reflected by the reflection mirror 14. In FIG. 12, if it is supposed that the setting incident angle $\theta$ to the liquid is 50°, tilt angle of the device, i.e. tilt angle $\alpha$ of the free liquid surface 1 is 10', and refractive index n of the liquid is 1.4, by the equation (2) obtained by referring to FIG. 1, the reflection displacement angle $\xi 1x'$ in case the free liquid surface 1 is tilted around x-axis and the reflection displacement angle $\xi 1z'$ in case the free liquid surface 1 is tilted around z-axis are $\xi 1x'=28'$ and $\xi 1z'=18'$ respectively. Therefore, the difference of sensitivity between reflection displacement angle $\xi 1x'$ and the reflection displacement angle $\xi 1z'$ is $(\xi 1x'/\xi 1z')=1.555$. Under this condition, therefore, $$\xi 1x'=2n\alpha; \xi 1z'=1.286n\alpha \qquad (13)$$

The anamorphic prism system 33 optically compensates the difference of sensitivity.

Figure 13:
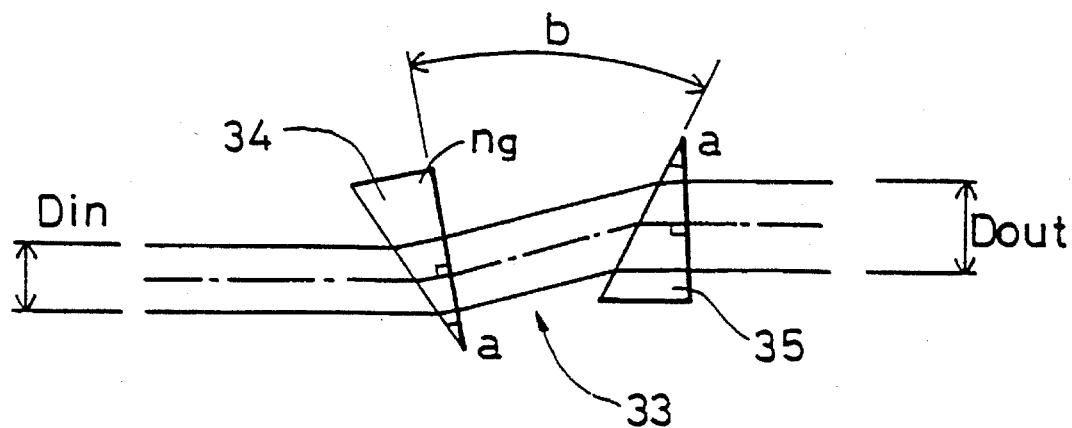
FIG. 13 is a drawing for explaining changes of optical axis transmitted light beam to an anamorphic prism system in the third embodiment.
Figure 14A:
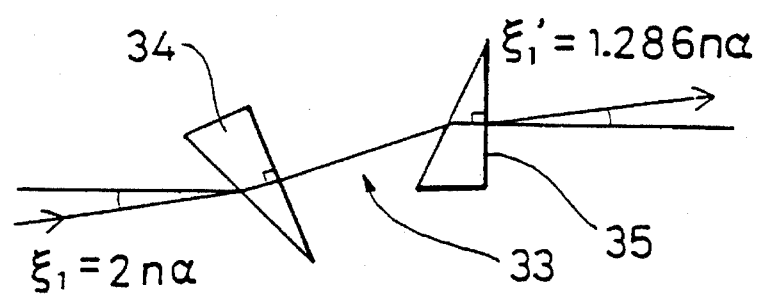
FIG. 14 (A) and FIG. 14 (B) each is a drawing for explaining changes of optical axis of transmitted light beam to the anamorphic prism system.
Figure 14B:
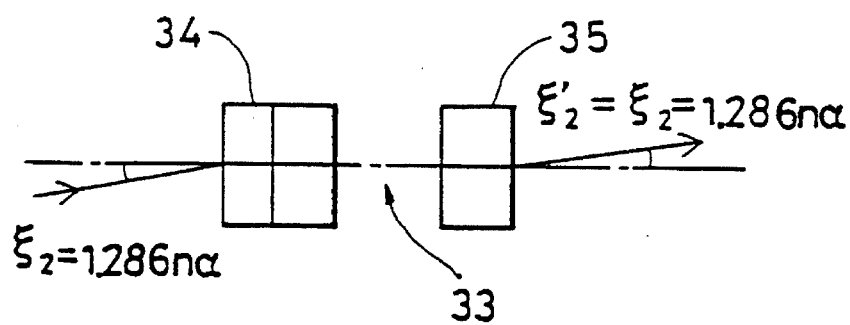

Here, description is given on the anamorphic prism system 33, referring to FIG. 13 and FIGS. 14(A) and 14(B).

If it is supposed that apex angles of the wedge-like prisms 34 and 35 of the anamorphic prism system 33 are a34 and a35 respectively, relative angle of the wedge-like prisms and 35 is b, refractive index is ng, incident light beam is Din and exit light beam is Dout:

$$\text{Magnification } M=(Din/Pout)=\cos^2 \cdot \sin^2 a) \qquad (14)$$

Thus, the angular magnification is approximately 1/M. Therefore, if the prism apex angles a34 and a35, relative angle b of the wedge-like prisms 34 and 35, and the refractive index ng are selected in such manner that the following relation exists:

$$M=2n\alpha/1.286n\alpha=1.555 \qquad (15)$$

(e.g. if ng=1.51, a34 and a35=27.732°, and b=44.793°), then $\xi 1x'$ after passing through the anamorphic prism system 33 is converted to: $2 n\alpha \times 1.286 n\alpha/2 n\alpha=1.286 n\alpha$, and $\xi 1x'= \xi 1z'$ after passing through the anamorphic prism system 33.

An optical axis of the reflected light beam 3 after passing through the anamorphic prism system 33 always has uniform reflection displacement angle with respect to tilting of the free liquid surface 1 in all directions. Thus, even when the free liquid surface 1 is tilted in any direction, it is always possible to obtain the reflection displacement angle with the same sensitivity with respect to the tilting.

Further, when the light beam passing through the anamorphic prism system 33 and being reflected upward by the reflection mirror 14 passes through the beam expander 12 and if angular magnification of the beam expander 12 is 1/1.286 n, the optical axis after passing through the beam expander is tilted by:

$$(\xi 1x'=\xi 1z'=1.286n\alpha)\times 1/1.286n=\alpha \qquad (16).$$

and the final optical axis after passing through the beam expander 12 runs always perpendicularly to the free liquid surface 1, i.e. always in vertical direction. If it is supposed that focal length of the convex lens 10 of the beam expander 12 is f3 and focal length of the convex lens 11 is f4, angular magnification of the expander 12 is f3/f4. By selecting the values of f3 and f4, angular magnification can be set to 1/1.286 n.

Next, in the embodiment shown in FIG. 12, the anamorphic prism system 33 may be rotated by 90°, and the prism apex angles a34 and a35 of the wedge-like prisms 34 and 35, relative angle b of the wedge-like prisms 34 and 35 and refractive index ng may be properly selected in such manner that the value of M is 1/1.555.

The anamorphic prisms system 33 in the above optical system is generally utilized to form the beam of elliptical shape into circular shape. For example, in case laser diode is used as the light source, cross-sectional shape of the light beam can be made closer to circular shape by the anamorphic prism system 33. (Beam shape of laser diode is in elliptical shape.)

In general, the devices used in combination with such laser diode have often the functions as a laser pointer or a laser marker, and it is desirable that the shape of irradiated beam is closer to circular shape. Therefore, the utilization of the anamorphic prism system 33 for correction of an optical axis is very effective for obtaining the beam of circular shape.

As described above, it is possible according to the present invention to maintain the optical axis of exit light beam always in vertical direction. In the following, description will be given on an application example related to the third embodiment of FIG. 12.

Figure 15:
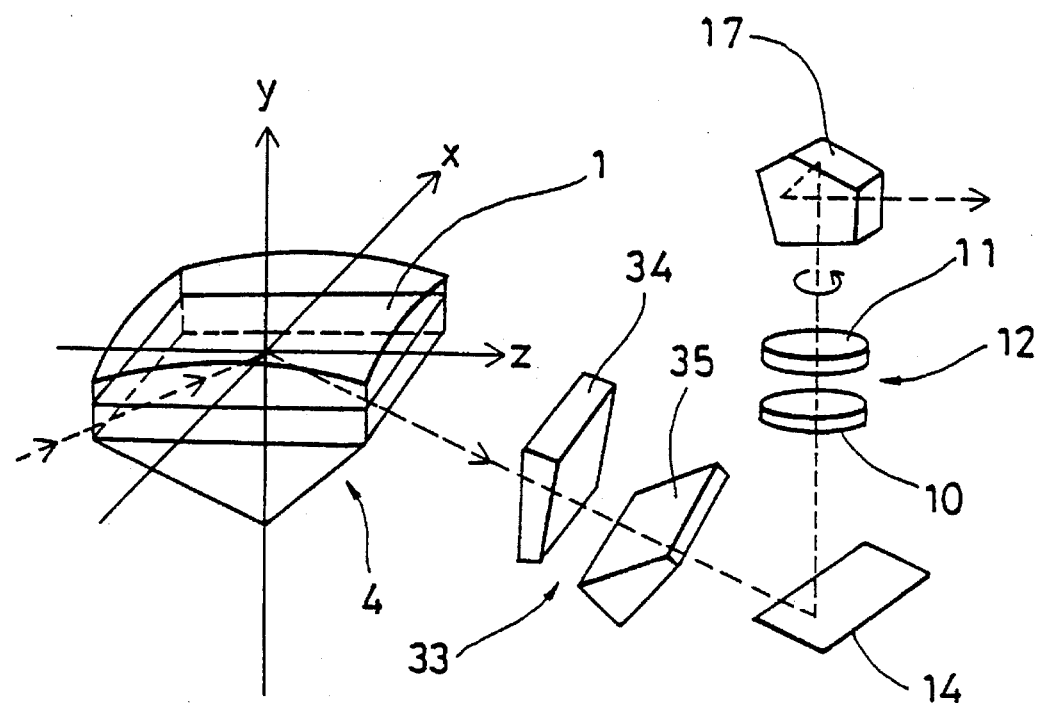
FIG. 15 is a drawing for explaining an application example relating to the third embodiment of the present invention.

FIG. 15 shows a pentagonal prism or a pentagonal mirror 17 rotatably arranged along the optical axis of light beam emitted from the beam expander 12. The exit light beam is emitted horizontally by the pentagonal mirror 17, and by rotating the pentagonal mirror 17, it is possible to form a horizontal reference plane by the exit light beam. Specifically, the present invention can be applied for a levelling device.

Figure 16:
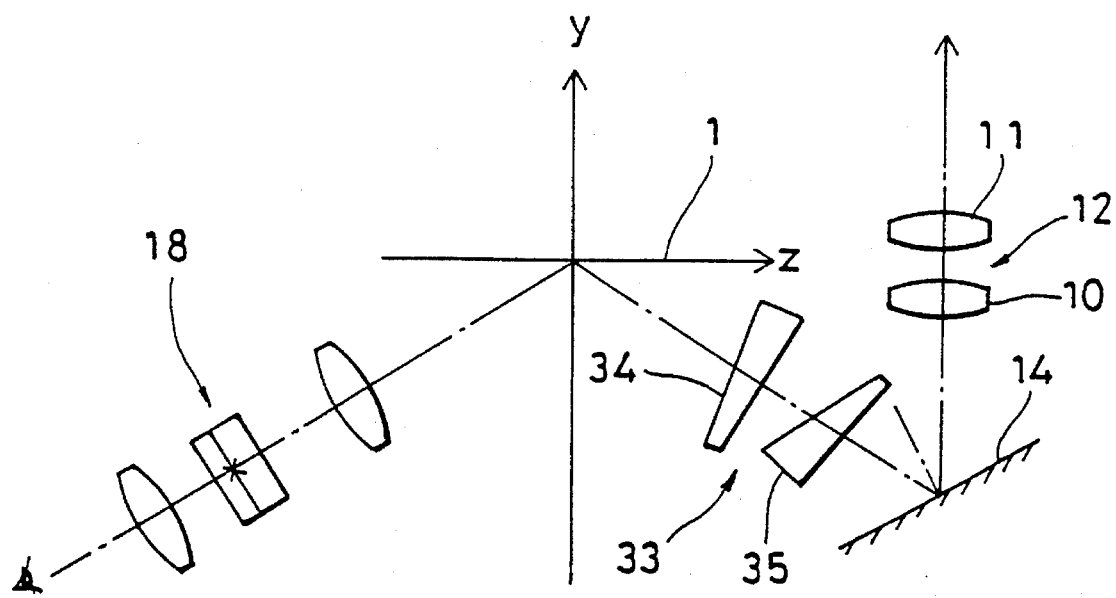
FIG. 16 is a drawing for explaining another application example relating to the third embodiment of the present invention.

FIG. 16 shows still another application example.

In this application example, a telescope system 18 is arranged on the light source side of the third embodiment of FIG. 12. With such arrangement, this can be utilized as a vertical device just as the application example of FIG. 9.

Figure 17:
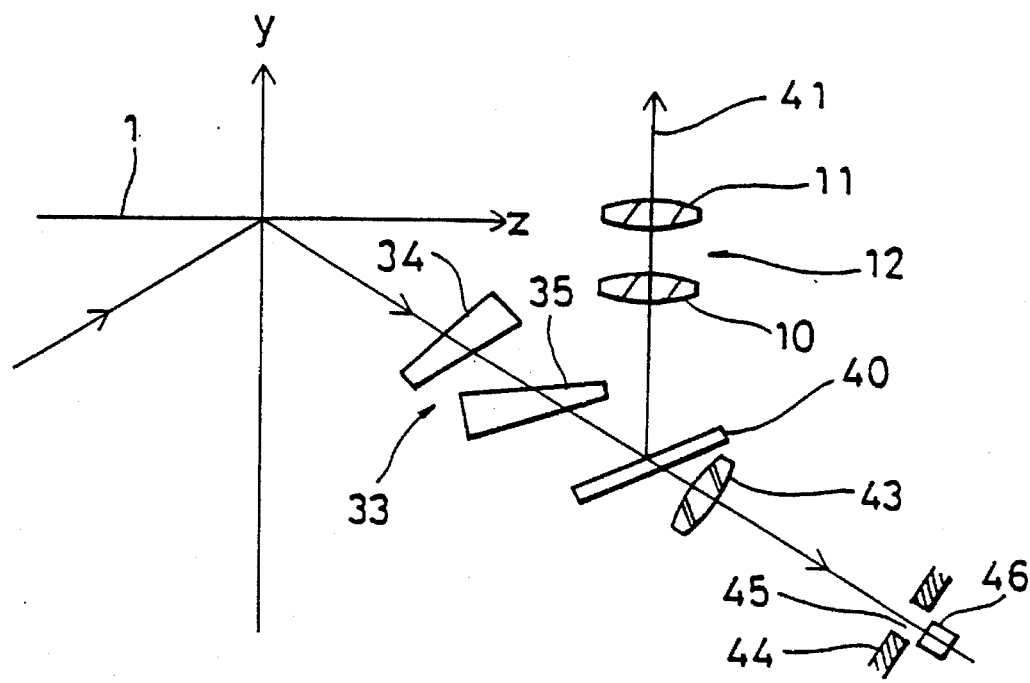
FIG. 17 is a drawing for explaining still another application example relating to the third embodiment of the present invention.

When the system is practically used with the above arrangement, tilting of the entire system is usually limited. Thus, it is necessary to detect that the system is within the required limit of tilting when it is used. To meet the requirements, the same measure as given in FIG. 10 may be taken. This will be described below, referring to FIG. 17.

Instead of the reflection mirror 14 as described above, a half-mirror 40 is disposed, and the reflected light beam from the free liquid surface 1 is split into a reflected light beam 41 in vertical direction and a transmitted light beam 42. The transmitted light beam 42 passes through a convex lens 43 and through a pinhole 45 formed on a shielding plate 44 and is received by a photodetector 46. The pinhole is arranged at focal point of the convex lens 43. Also, a diameter of the pinhole 45 is to be in size corresponding to the range of limitation.

When the entire system is tilted, the optical axis of the light beam reflected from the free liquid surface 1 is deviated. Because the anamorphic prism system 33 is included in this system as described above, the reflected light beam exhibits uniform sensitivity to tilt angle of the entire system in all directions. The transmitted light beam 42 passes through the convex lens 43 and the pinhole 45 and is received by the photodector 46. The pinhole 45 and the photodetector 46 arranged at the focal point of the convex lens 43. If it is supposed that focal length of the convex lens 43 is f0, the optical axis move by f0·tan $\xi 0$ on the pinhole 45 with respect to the reflection displacement angle $\xi 0$.

When this movement exceeds the required limit of tilting, the diameter of the pinhole 45 is determined so that light quantity received by the photodetector 46 is below the required light quantity.

By monitoring the light quantity received by the photodetector 46, it is possible to judge whether tilting of the entire system is within the limited angle.

For example, if it is supposed that incident angle θ to the free liquid surface 1 is 50°, limited tilt angle α of the entire system is 10', refractive index n of the liquid is 1.4, focal length f0 of the convex lens 43 is 100 mm, and pinhole diameter is R, then the deviation of optical axis after passing through the anamorphic prism system 33 is: ξ0 =1.286 n α. Therefore, the movement 1 of optical axis of the pinhole 45 (position of focal point of the convex lens 43 is given by:

$$l = f0 \cdot \tan \xi 0 = 100 \times \tan(1.286 \times 1.4 \times 10/60) = 0.52 \quad (17)$$

Figure 18:
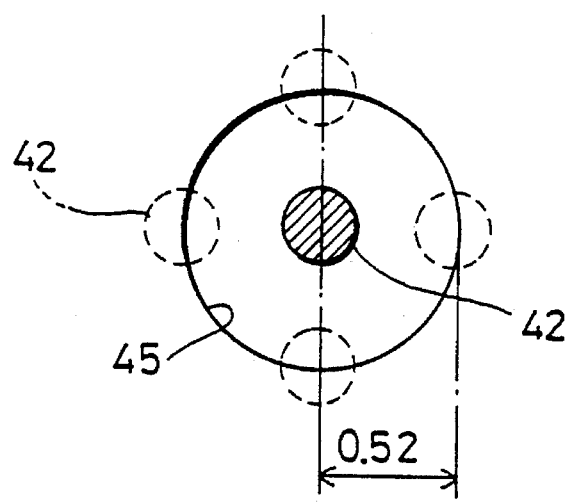
FIG. 18 is a drawing for explaining relationship between a beam spot and a pinhole in still another application example of the invention.

In case the pinhole 45 has an opening of this diameter and when beam spot of the transmitted light beam 42 moves by 0.52 mm as shown in FIG. 18, it is over outer diameter of the pinhole 45, and the received light quantity of the shielding plate 44 decreases. Accordingly, by stopping light emission from the light source 6 when the decreased light quantity is detected, the present invention can be used only within the required limit.

Figure 19:
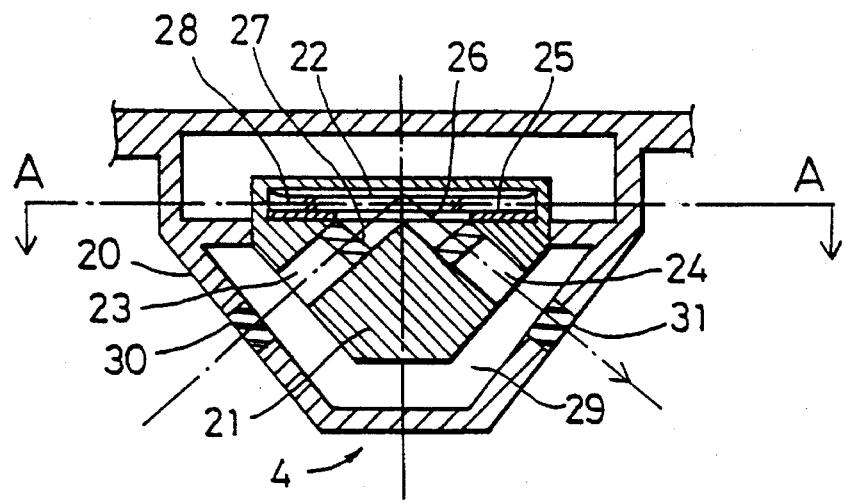
FIG. 19 is a front cross-sectional view of a concrete example of a liquid container.
Figure 20:
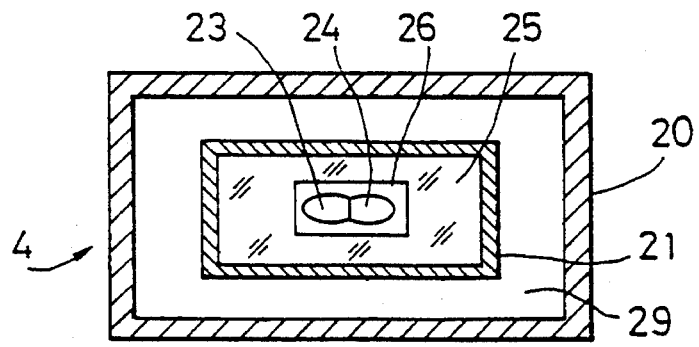
FIG. 20 is an arrow diagram along the line A—A of FIG. 19.

Next, description will be given on an example of the container 4 with sealed liquid referring to FIG. 19 and FIG. 20.

The container 4 with sealed liquid is fixed on main unit of the device together with other lens systems or it is constituted as a part of the device. In this case, if the device is used under environmental condition where there occurs temperature difference, e.g., in case the device is brought outdoors from inside the building, temperature distribution occurs within the liquid sealed in the container Once temperature distribution occurs in the liquid, refractive index also shows a distribution to match such temperature distribution, and refraction of optical axis occurs within the liquid. The example of the container 4 with sealed liquid given in FIG. 19 and FIG. 20 is useful to solve such problems.

Detailed description is as follows:

Inside an outer case 20 in inverted trapezoid shape, an inner case 21 in a shape similar to the outer case 20 in provided. Along upper surface of the inner case 21, a space 22 in planar shape is formed, and a light entering path 23 and a light exit path 24 communicated with the space 22 are provided. Axial center of the light entering path 23 is aligned with optical axis of the incident light beam, and axial center of the light exit path 24 is aligned with optical axis of the reflected light beam when the free liquid surface 1 is horizontal.

On bottom surface of the space 22, a heat transfer plate 25 is fixed. The heat transfer plate 25 is provided with a window hole 26 at its center so that an incident light beam and reflected light beam can go through. On each of upper ends of the light entering path 23 and the light exit path 24, a transparent glass cock 27 is fixed, and transparent liquid 28 is tightly sealed by the cock 27. Sealing quantity of the transparent liquid 28 is determined so that free liquid surface is formed.

The inner case 21 is accommodated in the outer case 20, and a predetermined surrounding space 29 is formed around the inner case 21. Glass windows 30 and 31 are arranged at the positions where axial centers of the light entering path 23 and the light exit path 24 of the outer case 20 pass through. The outer case 20 is designed in airtight construction, and the surrounding space 29 is kept in vacuum condition or gas is sealed in it.

Further, the outer case 20 and the inner case 21 are made of a material having lower thermal conductivity such as synthetic resin in order to minimize heat radiation and heat absorption to and from outside.

As described above, the space 22 where the transparent liquid 28 is sealed is designed in thin planar shape and a heat transfer plate 25 is provided on the bottom surface of the space. As a result, heat propagation speed is increased and the property to keep uniform temperature is increased when temperature change occurs in the transparent liquid 28. The surrounding space 29 serves as a heat insulating layer to the heat transfer to and from the inner case 21. Thus, temperature change or temperature change speed of the transparent liquid 28 is suppressed.

The occurrence of temperature distribution difference within the transparent liquid 28 is suppressed, and this prevents the refraction of optical axis of the light beam and the change of cross-sectional shape of the light beam caused by the change of refractive index. As a result, stability to temperature change of environment increases, and measuring accuracy is raised.

Figure 21:
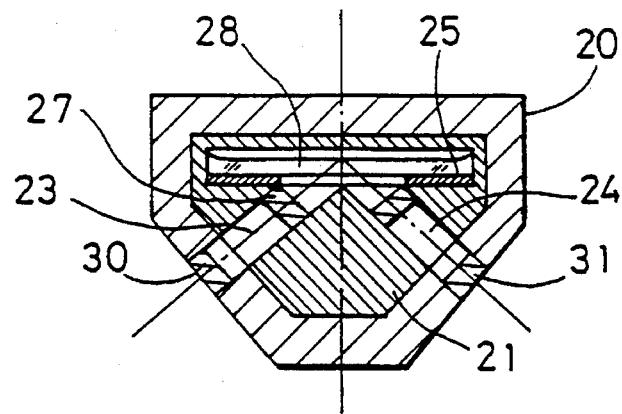
FIG. 21 is a front cross-sectional view of another concrete example of the liquid container.

Next, FIG. 21 shows another example of the container 4 with sealed liquid. Without forming the surrounding space 29 around the inner case 21, the inner case 21 is enclosed by the outer case 20 made of heat-insulating material, and heat insulating layer is formed around the inner case 21 by the outer case 20.

It is needless to say that the shape of the container 4 with sealed liquid is not limited to the above examples.

INDUSTRIAL APPLICABILITY

As described above, the tilt angle automatic compensator according to the present invention is useful as a vertical device or as a levelling device to provide a reference line by reflected light beam and a reference plane by scanning the reflected light beam, in case of measuring a tilt of device, in case of being equiped for a survey instrument required horizontality and verticality or in case of compensating tilt angle of the survey instrument.

What we claim are:

1. A tilt angle automatic compensator, comprising a container where a transparent liquid to form a free liquid surface is sealed, a light projection system for projecting a light beam toward the free liquid surface at a predetermined angle so that it is totally reflected from the free liquid surface along an optical path, and an optical system, arranged at a predetermined position along the optical path of the totally reflected light beam after passing through the container with sealed liquid, for equalizing in all directions change of the reflection angle of the reflected beam corresponding to change of incident angle of the incident beam.

2. A tilt angle automatic compensator according to claim 1, wherein the optical system comprises a convex cylindrical lens and a concave cylindrical lens.

3. A tilt angle automatic compensator according to claim 1, wherein the optical system comprises an anamorphic prism system.

4. A tilt angle automatic compensator, comprising a container where a transparent liquid to form a free liquid surface is sealed, a light projection system for projecting a light beam toward the free liquid surface at a predetermined angle so that it is totally reflected from the free liquid surface along a first optical path, a mirror for re-reflecting in a vertical direction along a second optical path the light beam reflected from the free liquid surface, a first optical system, arranged at a predetermined position along said first optical path, for equalizing in all directions change of the reflection angle of the reflected beam corresponding to change of incident angle of the incident beam and a second optical system, arranged at a predetermined position along said second optical path, for offsetting angular change of the re-reflected beam corresponding to change of incident angle of the incident beam.

5. A tilt angle automatic compensator according to claim 4, wherein the first optical system comprises a convex cylindrical lens and a concave cylindrical lens and wherein the second optical system comprises a beam expander.

6. A tilt angle automatic compensator according to claim 4, wherein the second optical system comprises a set of toric lenses.

7. A tilt angle automatic compensator according to claim 4, wherein the first optical system comprises an anamorphic prism system and the second optical system comprises a beam expander.

8. A tilt angle automatic compensator according to claim 4, wherein there is provided an optical path converting means for receiving the light beam traveling in a vertical direction and for emitting a light beam in horizontal direction.

9. A tilt angle automatic compensator according to claims 1 or 4, wherein a telescope system is arranged on incident light beam side entering the free liquid surface.

10. A tilt angle automatic compensator according to claim 4, wherein the mirror for re-reflecting the light beam in a vertical direction is provided as a half-mirror, the light beam passing through the half-mirror is received by a photodetector, and moving of optical axis of the light beam transmitted through the half-mirror is detected by the photodetector.

11. A tilt angle automatic compensator according to claims 1 or 4, wherein a transparent liquid is sealed in a space of planar shape.

12. A tilt angle automatic compensator according to claim 11, wherein a heat transfer plate is provided at bottom surface of the space of planar shape.

13. A tilt angle automatic compensator according claims 1 or 4, wherein a heat insulating layer is formed around an inner case where the transparent liquid is sealed.

* * * * *